Aug. 4, 1959  G. A. GOEPFRICH  2,898,120
JAW CENTERING DEVICE FOR CHUCKS
Filed Feb. 3, 1958

INVENTOR.
GEORGE A. GOEPFRICH
BY
Lindsey and Prutzman
ATTORNEYS

United States Patent Office 2,898,120
Patented Aug. 4, 1959

2,898,120

JAW CENTERING DEVICE FOR CHUCKS

George A. Goepfrich, New Britain, Conn., assignor to The Skinner Chuck Company, New Britain, Conn., a corporation of Connecticut Application February 3, 1958, Serial No. 712,799

8 Claims. (Cl. 279—116)

This invention relates to a novel and improved jaw centering device for chucks.

In universal chucks, wherein means, such as a scroll cam, is provided to move all of the jaws of the chuck simultaneously, it is extremely difficult to provide precise accuracy in centering the work relative to the axis of the spindle supporting the chuck. This is due in part to initial manufacturing tolerances and becomes accentuated as a result of subsequent wear on the jaw driving means and the work engaging surfaces of the jaws. Various expedients have been proposed to permit radial adjustment of the work holding portion of the chuck relative to the back portion of the chuck to correct eccentricity but, in general, such expedients have not provided the degree of fine adjustment required for precise accuracy and the adjustment of the chuck has been unduly complicated and difficult to accomplish in actual practice.

A principal object of the present invention is to provide a jaw centering mechanism for universal chucks which provides the high degree of accuracy required for precise centering of the work relative to the axis of rotation.

A further object is to provide such a jaw centering mechanism which is simple to operate and which will require a minimum of time and skill for obtaining the precise centering of which the mechanism is capable.

Another object is to provide such a centering mechanism which can also function as the sole connecting means between the relatively movable portions of the chuck thus eliminating the need for additional fastening members and simplifying the adjusting operation as well as increasing the accuracy.

It is further an object of this invention to provide jaw centering means of the type described which is simple and relatively economical to fabricate, which is rugged so as to provide trouble-free service over extended periods, and which is relatively compact so that no material increase in size of the chuck is required.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figures 1, 2:
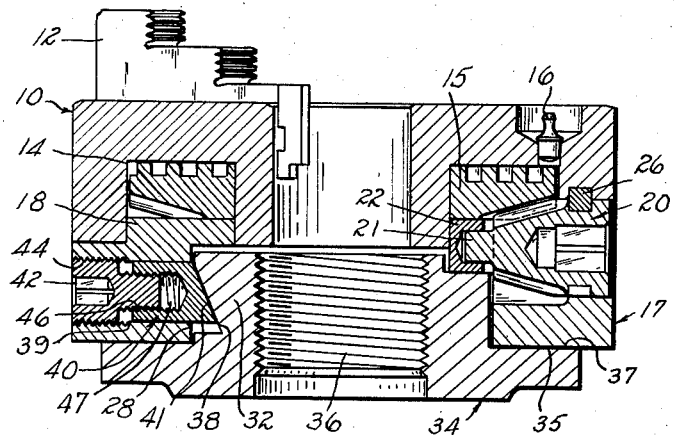
Fig. 1 is a front view of a chuck incorporating the present invention.
Fig. 2 is a cross-sectional view of the chuck of Fig. 1 substantially along the line 2—2 thereof with one of the jaws omitted.

With reference to the drawings, a chuck constructed in accordance with the invention comprises a body portion including a rotatable body member 10 on which are slidably mounted a plurality of jaws 12 for movement radially of the body member. The body member 10 is provided with an annular recess 14 disposed coaxially thereof and facing rearwardly thereof. A scroll cam 15 is rotatably received in the recess 14 and is engaged with the jaws 12 for movement of the jaws radially of the chuck in response to the rotation of the scroll cam. A grease fitting 16 on the body member provides a means for lubrication of the internal jaw operating elements of the chuck.

The body portion of the chuck further comprises an adapter 17 disposed coaxially of the body member 10 and provided with an annular ring-like projection 18 engaged within the recess 14 of the body member. A plurality of bolts 19 extending in an axial direction near the periphery of the body 10 and adapter 17 retain the body member and adapter in fixed assembly to form the main body of the chuck. A beveled drive gear 20, which is socketed at its outer end to receive a turning tool, is rotatably received, as shown in Fig. 1, in radially extending, matching recesses in the body member and adapter and meshes with the bevel gear 23 on the scroll cam 15 for rotation thereof. A journal block 22, preferably rectangular in cross-section, is engaged in a correspondingly shaped recess in the adapter 17 and rotatably supports the stub shaft 21 on the inner end of the gear 20. A locking ring segment 26 is engaged in an annular groove on the gear 20 and in a recess in the body member 10 to prevent movement of the gear 20 radially of the body.

The adapter 17 is provided with a central aperture 28 extending coaxially therethrough in which is received, in radially spaced relation, a projection 32 extending coaxially from the back plate 34 of the chuck. The back plate 34 and adapter 17 are provided with axially oppositely facing surfaces 35, 37 which are engageable to limit movement of the back plate axially inwardly of the chuck. The back plate 34 is provided with a threaded bore 36 for mounting the back plate on a spindle (not shown). The specific means shown for mounting the chuck on a machine is shown merely by way of example and it is, of course, understood that other suitable means may be employed without departing from the invention.

Mounted in radial apertures 39 in the adapter 17 are centering slides or wedges 40 which are arranged to engage the projection 32 at their inner ends and are movable radially by the screws 44 in a manner to be described more particularly hereinafter. While various expedients such as keys or splines or the like (not shown) may be utilized, if desired, to prevent turning of the slides or wedges 40 with the screws 44, the slides or wedges 40 are restrained from turning movement in the specific embodiment solely by the engagement of their inner ends with the projection 32.

In accordance with the invention, each of the screws 42 has a threaded head portion 44 which threadably engages the tapped outer end of aperture 39 and a threaded reduced inner end portion 46 which threadably engages in the tapped opening 47 in the associated slide or wedge 40 and is socketed at its outer end, as shown, to receive a suitable turning tool. The threaded portions 44, 46 are threaded in the same direction but have a different number of threads per inch with the result that the movement of the slide or wedge 40 as a result of turning the screw 42 is a function of the difference in number of threads per inch. Thus a very fine and precise positioning of the slides or wedges 40 can be attained.

The projection 32 is provided with flat bearing surfaces 38 corresponding in number to the slides or wedges 40 and against which the slides or wedges 40 bear in order to precisely fix the radial position of the back plate 34 relative to the adapter 17 and body 10. By turning the screws 42, the operator can quickly and easily adjust the position of the jaws relative to the axis of rotation in any radial direction to correct for eccentricity.

In the preferred embodiment of the invention, the bearing surfaces 38 are inclined outwardly and inwardly of the adapter 17 and the slides or wedges 40 have similarly inclined bearing surfaces 41. Thus engagement of the surfaces 41 with the surface 38 serves to draw in the back plate 34 relative to the adapter 17, thus locking the members in axial assembly and providing a driving connection therebetween without the need for connecting screws or other connecting means between the body of the chuck and the back plate as commonly required in chucks having an adjusting mechanism. As will be apparent, the backing off of a pair of the screws 42 during an adjusting operation will automatically loosen the axial engagement of the back plate and adapter to condition the device for radial adjustment and then, when adjustment is completed, the back plate is automatically reclamped in adjusted position on the adapter. Thus, since there is no need to manipulate any auxiliary holding screws, the adjusting operation is greatly simplified and facilitated and disturbance of the precise setting is unlikely to occur.

While the invention has been described in terms of the specific embodiment shown, it will, of course, be apparent to those skilled in the art that various modifications may be made in the structure disclosed without departing from the scope of the invention, and it is intended that all such modifications are to be included within the invention.

I claim:

1. In a chuck, a rotatable chuck body member adapted to carry a plurality of jaws, a back plate member disposed generally coaxially of the body member and adjustable radially thereof, an axially extending projection on one member extending into a central aperture in the other member and leaving a plurality of circumferentially spaced flat bearing surfaces facing in a generally radial direction, radially adjustable slides carried by the other member for wedging engagement with said flat bearing surfaces, and means to adjust the radial position of the slides to center the chuck body member relative to the back plate.

2. In a chuck, a rotatable chuck body member adapted to carry a plurality of jaws, a back plate member disposed generally coaxially of the body member and adjustable radially thereof, an axially extending projection on one member extending into a central aperture in the other member and leaving a plurality of circumferentially spaced flat bearing surfaces facing in a generally radial direction, radially adjustable slides carried by the other member for wedging engagement with said flat bearing surfaces, and means to adjust the radial position of the slides to center the chuck body member relative to the back plate, said flat bearing surfaces being inclined outwardly relative to the axis of the chuck whereby the wedging engagement thereof with the slides draws the members together in an axial direction.

3. In a chuck, a rotatable chuck body member adapted to carry a plurality of radially movable jaws, a back plate member adjustable radially of the body member and adapted to support the chuck on a spindle and the like, an axially extending projection on one member extending into an aperture in the other member, and means for centering the body member relative to the spindle comprising a plurality of circumferentially spaced slides slidably but non-rotatably carried by said other member for engagement in a radial direction with the projection of said one member, and means for adjusting the radial position of the slides comprising a screw associated with each slide having a first threaded portion threadably engaged with said other member and a second portion threadably engaged with the slide, said threaded portions being threaded in the same direction but having a different number of threads per inch whereby fine radial adjustment of the slides may be accomplished by turning the screws.

4. In a chuck, a rotatable chuck body portion adapted to carry a plurality of radially movable jaws, a back plate adjustable radially of the body portion and adapted to support the chuck on a spindle and the like, said body portion having a central aperture and said back plate having an axially extending projection disposed within the aperture, said body portion having a plurality of radially extending circumferentially spaced apertures communicating with said central aperture, a slide slidably but non-rotatably mounted in each aperture and engaging said projection, and means for adjusting the radial position of the slides comprising a screw having a head portion threadably engaged with the outer end of each radial aperture and having a threaded inner end portion threadably engaged with the slide, said head portion and said inner end portion being threaded in the same direction but having a different number of threads per inch.

5. In a chuck, a rotatable chuck body member adapted to carry a plurality of radially movable jaws, a back plate adjustable radially of the body member and adapted to support the chuck on a spindle and the like, said body portion having a central aperture and said back plate having an axially extending projection disposed within the aperture, said projection having a plurality of flat bearing surfaces circumferentially spaced and being inclined outwardly and forwardly of the projection, and means for adjusting the body member radially of the back plate and clamping the body member to the back plate in an axial direction comprising a plurality of radial apertures in said body member, each facing one of said flat bearing surfaces, a wedge non-rotatably positioned in each radial aperture in engagement with a flat bearing surface of the projection, and screw means in each aperture for adjusting the radial position of the wedges.

6. In a chuck, a rotatable chuck body member adapted to carry a plurality of radially movable jaws, a back plate adjustable radially of the body member and adapted to support the chuck on a spindle and the like, said body portion having a central aperture and said back plate having an axially extending projection disposed within the aperture, said projection having a plurality of flat bearing surfaces circumferentially spaced and being inclined outwardly and forwardly of the projection, and means for adjusting the body member radially of the back plate and clamping the body member to the back plate in an axial direction comprising a plurality of radial apertures in said body member, each facing one of said flat bearing surfaces, a wedge nonrotatably positioned in each radial aperture in engagement with a flat bearing surface of the projection, and screw means in each aperture for adjusting the radial position of the wedges comprising a screw having a first threaded portion threadably engaged with the wall of the aperture and having a second threaded portion threadably engaged with the wedge, said threaded portions being threaded in the same direction but having a different number of threads per inch.

7. In a chuck, a rotatable chuck body adapted to carry a plurality of jaws, a rotatable back plate disposed generally coaxially of said body, an adapter member disposed generally coaxially of and intermediate said body and back plate, said adapter member being carried by said body for rotation therewith and having a recess extending coaxially of the body, said back plate having a projection extending into said recess in spaced relation to the sides thereof and being provided with a plurality of wide flat bearing surfaces angularly spaced about the back plate axis, said bearing surfaces facing radially outwardly, a plurality of slides slidably carried by said adapter for movement radially of said body and having relatively wide bearing surfaces respectively parallel with and engageable with the bearing surfaces on said projection, and a screw associated with each slide having a first threaded portion threadably engaged with the slide and a second threaded portion threadably engaged with the adapter, said threaded portions being threaded in the same direction but having a different number of threads per inch.

8. In a chuck, a rotatable chuck body adapted to carry a plurality of jaws, an adapter member carried by the body for rotation therewith and having a recess extending coaxially of said body, a back plate disposed generally coaxially of said body and engageable with said adapter in axial assembly, said back plate having a projection extending coaxially thereof and into said recess in radially spaced relation to the sides of said recess, said projection being provided with a plurality of flat radially outwardly facing flat bearing surfaces angularly spaced about the back plate axis and inclined axially outwardly of the back plate toward said body, a plurality of wedges slidably carried by said adapter for movement radially thereof and into said recess and having flat relatively wide bearing surfaces respectively parallel with and engageable with the bearing surfaces on said projection to draw the back plate and adapter member together in an axial direction and form a driving connection therebetween, and a screw associated with each wedge having a first threaded portion threadably engaged with said adapter and a second threaded portion threadably engaged with the wedge, said threaded portions being threaded in the same direction but having a different number of threads per inch whereby fine radial adjustment of the wedges is accomplished by turning the screws.

References Cited in the file of this patent

UNITED STATES PATENTS

| | | |
|---|---|---|
| 1,511,529 | Standlee | Oct. 14, 1924 |
| 2,167,014 | Verderber | July 25, 1939 |
| 2,437,740 | Haynes | Mar. 16, 1948 |
| 2,767,993 | Galler | Oct. 23, 1956 |
| 2,785,902 | Zajdel | Mar. 19, 1957 |
| 2,822,181 | Sloan | Feb. 4, 1958 |

FOREIGN PATENTS

| | | |
|---|---|---|
| 39,934 | France | Dec. 28, 1931 |
| | (First add. to 637,602) | |